United States Patent
Zhang et al.

(10) Patent No.: US 10,609,342 B1
(45) Date of Patent: Mar. 31, 2020

(54) MULTI-CHANNEL SENSING SYSTEM WITH EMBEDDED PROCESSING

(71) Applicant: inSight, Inc., Saratoga, CA (US)

(72) Inventors: Yi Zhang, Mountain View, CA (US); Li Xu, Saratoga, CA (US); Hua Shu, Sunnyvale, CA (US); Jason T. Yang, Cupertino, CA (US)

(73) Assignee: inSight, Inc., Saratoga, CA (US)

( * ) Notice: Subject to any disclaimer, the term of this patent is extended or adjusted under 35 U.S.C. 154(b) by 0 days.

(21) Appl. No.: 16/016,478

(22) Filed: Jun. 22, 2018

Related U.S. Application Data

(60) Provisional application No. 62/523,266, filed on Jun. 22, 2017.

(51) Int. Cl.
*H04N 7/18* (2006.01)
*G06K 9/00* (2006.01)
*G06N 3/08* (2006.01)

(52) U.S. Cl.
CPC ......... *H04N 7/181* (2013.01); *G06K 9/00335* (2013.01); *G06K 9/00771* (2013.01); *G06N 3/08* (2013.01)

(58) Field of Classification Search
CPC ..... H04L 67/12; H04L 63/1416; H04L 67/22; G06N 3/02; G06N 3/08; G06K 9/00791;
(Continued)

(56) References Cited

U.S. PATENT DOCUMENTS 6,487,478 B1 * 11/2002 Azzaro ............... B60L 3/12
340/3.1

7,095,328 B1 * 8/2006 Stern .................. G08B 21/0415
340/522
(Continued)

FOREIGN PATENT DOCUMENTS

WO 2004036804 A2 4/2004

OTHER PUBLICATIONS

Labeofan et al., "Occupancy measurement in commercial office buildings for demand-driven control applications—A survey and detection system evaluation", Energy and Buildings, vol. 93, 2015, pp. 303-314.

*Primary Examiner* — Dave Czekaj
*Assistant Examiner* — Daniel Chang
(74) *Attorney, Agent, or Firm* — Chen Yoshimura LLP

(57) ABSTRACT

System and method for monitoring objects of interest including persons in an indoor or outdoor scene with high accuracy, strong privacy protection, high security, low volume data transmission and storage. The system includes: an embedded sensing device with multiple sensors and microprocessor(s) with built-in artificial intelligence as an end unit with parametric outputs, a controller that aggregate parametric outputs from multiple end units with local intelligence and configurable control outputs, and an optional gateway that aggregates multiple controllers output and connect with the network, cloud and/or human interface. The embedded sensing devices can capture data of the scene through multiple sensors with different functions and technologies; detect and track the objects of interest including persons; analyze features of the objects of interest; detect event and behavior associated with the detected objects or persons of interest based on the features and/or events; and only provide these parametric outputs to controller.

15 Claims, 5 Drawing Sheets

(58) Field of Classification Search
CPC ............ G06K 9/3241; G06K 9/00771; G06K 9/00335; G06K 9/00362; G06K 9/6296; G06T 2207/20084; G06T 2207/20081; G06T 7/75; G06T 7/77; H04W 4/38; H04W 4/02; H04W 36/0016; H04W 36/0083; H04W 84/18
USPC ............... 455/456.6, 404.2; 340/3.1, 286.02, 340/539.17, 988; 348/14.01, 14.02; 382/115
See application file for complete search history.

(56) References Cited

U.S. PATENT DOCUMENTS

| | | | |
|---|---|---|---|
| 9,760,837 B1* | 9/2017 | Nowozin | G01S 7/4808 |
| 2003/0058111 A1 | 3/2003 | Lee et al. | |
| 2003/0229492 A1* | 12/2003 | Nolan | G07C 9/00158 704/247 |
| 2004/0114557 A1* | 6/2004 | Bryan | H04W 64/00 370/338 |
| 2004/0135880 A1* | 7/2004 | Royer | H04N 7/15 348/14.08 |
| 2005/0004818 A1* | 1/2005 | Liman | G06Q 10/02 705/5 |
| 2006/0063523 A1* | 3/2006 | McFarland | G08C 17/02 455/423 |
| 2007/0011196 A1* | 1/2007 | Ball | H04H 60/45 |
| 2007/0050240 A1* | 3/2007 | Belani | G06Q 30/0284 705/13 |
| 2008/0111666 A1* | 5/2008 | Plante | G07C 5/008 340/425.5 |
| 2008/0259162 A1* | 10/2008 | Aoki | G06K 9/32 348/159 |
| 2009/0195401 A1* | 8/2009 | Maroney | G06K 9/00335 340/686.6 |
| 2010/0026802 A1* | 2/2010 | Titus | G08B 13/19608 348/143 |
| 2010/0157064 A1* | 6/2010 | Cheng | G06K 9/00771 348/169 |
| 2010/0321183 A1* | 12/2010 | Donovan | G08B 13/19645 340/540 |
| 2011/0222726 A1* | 9/2011 | Ruan | G06K 9/00355 382/103 |
| 2012/0254220 A1* | 10/2012 | Verthein | G06Q 10/10 707/769 |
| 2014/0088865 A1* | 3/2014 | Thies | G06Q 10/04 701/465 |
| 2014/0293048 A1* | 10/2014 | Titus | G08B 13/19608 348/143 |
| 2015/0193127 A1* | 7/2015 | Chai | G08B 13/19645 715/719 |
| 2016/0012309 A1* | 1/2016 | Manabe | F24F 11/30 700/276 |
| 2016/0275376 A1* | 9/2016 | Kant | G06K 9/6277 |
| 2016/0350336 A1* | 12/2016 | Checka | G06K 9/6215 |
| 2017/0013069 A1* | 1/2017 | Grohman | H04L 67/22 |
| 2017/0046528 A1* | 2/2017 | Lambert | G06F 21/6218 |
| 2017/0132468 A1* | 5/2017 | Mosher | G06T 7/246 |
| 2018/0085927 A1* | 3/2018 | Kapoor | B25J 9/1697 |

\* cited by examiner

MULTI-CHANNEL SENSING SYSTEM WITH EMBEDDED PROCESSING

BACKGROUND OF THE INVENTION

Field of the Invention

This invention relates to a human activity monitoring system, and in particular, it relates to a multi-channel sensing system with embedded processing.

Description of Related Art

Monitoring systems for indoor and outdoor applications have a long history with various sensors such as smoke detector, motion sensor, temperature sensor and camera etc. With these detectors connected to computers, the internet and the cloud, these systems with different functions provide great improvement of people's safety and life quality.

As an example, senior care is an important application of monitoring systems. In the United States, there are an estimated 48 million elderly (over the age of 65) in 2016 and this population is expected to grow to 80 million in 2030. In a recent survey, 90 percent of seniors expressed a desire to remain in their homes as long as physically possible. Therefore, one of the fastest growing segments of the senior care market is at-home elder care services. However, traditional at-home care is still costly for seniors, their families and society in general. Many other countries have similar or even bigger challengers than that in the US. Advances in home healthcare technology, such as this invention, should increasingly reduce the senior care cost and make it more available to the general public.

We've come a long way from the "I've fallen and I can't get up" days. Safety monitoring and assistance technologies are improving quickly, being driven by advances in biosensing, sensory networks, artificial intelligence, telecommunications and cloud computing.

FIG. 1 schematically illustrates a traditional sensor network in which multiple sensors work independently and feed the information separately to users. However, these systems, especially with cameras, have major concerns/issues such as privacy, huge data size, limited insights, and potential security challenges.

Emerging sensor and connectivity technology has made possible the development of a new generation of monitoring systems that don't require the person being monitored (the resident) to wear a device. Instead, networks of sensors within the home connect to a cloud-based system with algorithms that learn the daily living patterns of the resident. The algorithm recognizes if there is a deviation that may require sending an alert to a smart phone or social media app so someone can take action, or at least pay closer attention. There are some existing technology or products aiming to provide this functionality, for example, the occupancy sensors and surveillance cameras.

SUMMARY

However, those technologies have the following limitations: Privacy concerns due to the nature of camera and microphone; accuracy of detection is limited by the type of sensors; extra large data accumulation and information overflow, especially the image/video data, even with data compression, which increases cost of data transport, storage and real-time analysis; security of sensor systems and sensitive data are not guaranteed.

It is a goal of embodiments of the present invention to provide an embedded intelligent sensor monitoring systems, to enable seniors to stay in their homes longer, living independently and feeling safer, knowing that they are being watched over without concern of privacy.

To achieve the above objects, the present invention provides a parametric sensor network system, which includes: a plurality of embedded sensing devices, each including: a plurality of sensors, including at least one imaging sensor; and a data processing unit connected to and receiving data from the plurality of sensors, the data processing unit including one or more processors and data storage devices, the data processing unit implementing artificial neural network models for object detection, the data storage configured to store data generated by the plurality of sensors, wherein the data processing unit generates parametric data based on the data received from the sensors using the object detection algorithm; a controller connected to and receiving data from each of the plurality of embedded sensing devices; and a plurality of actuators coupled to the controller; wherein each embedded sensing device outputs only the parametric data to the controller without outputting any video, image or audio data generated by the sensors; and wherein the controller generates commands for controlling the actuators based on the parametric data received from the plurality of embedded sensing devices.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provide a system and related method for monitoring objects of interest including persons in an indoor or outdoor scene with high accuracy, strong privacy protection, high security, low volume data transmission and storage.

Figure 1:
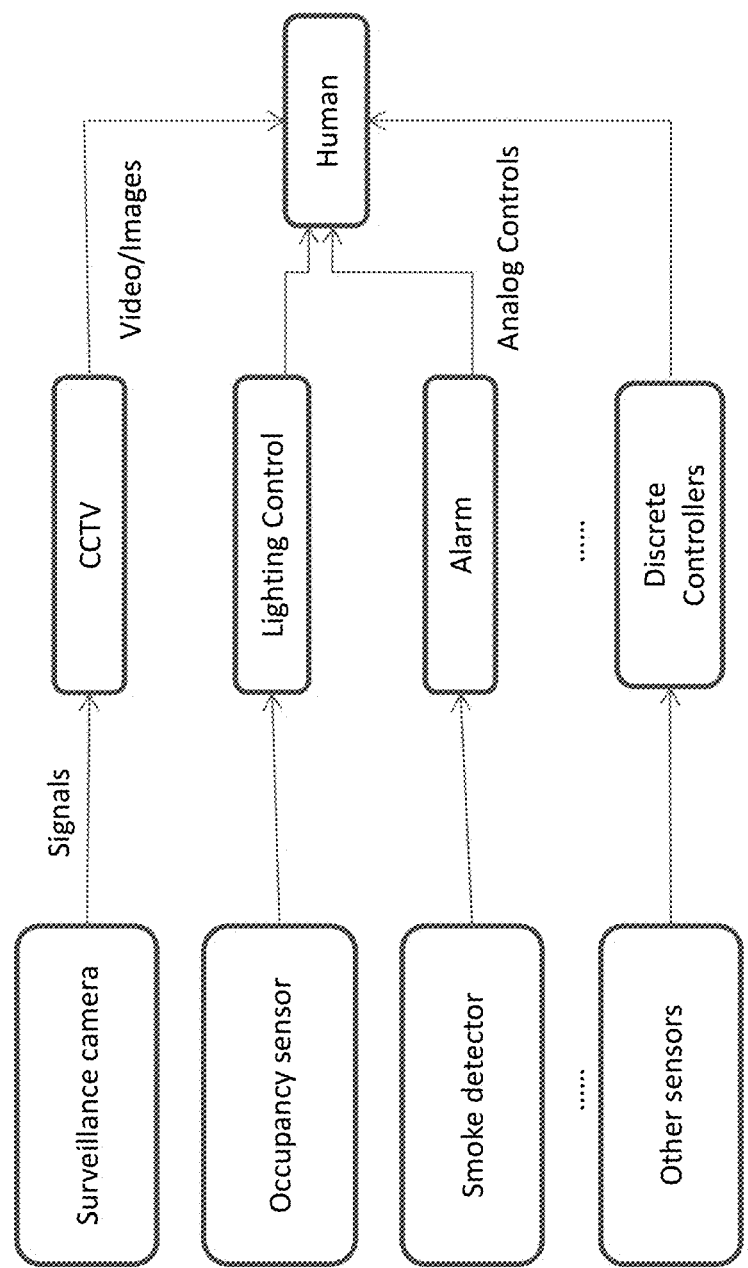
FIG. 1 is a schematic of a traditional sensor network in which multiple sensors work independently and feed the information separately to users.
Figure 2:
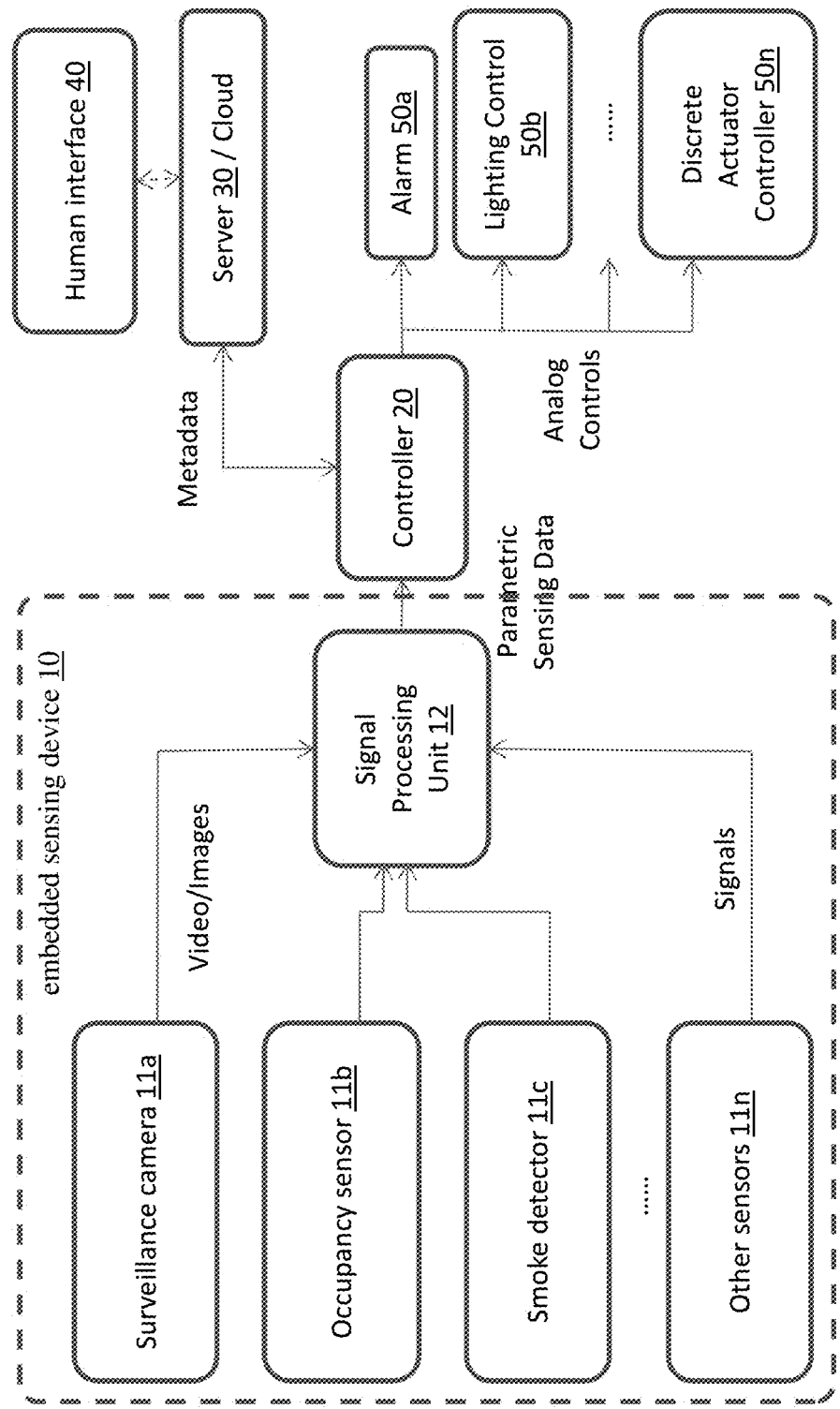
FIG. 2 is a schematic of a parametric sensor network according to an embodiment of the present invention, in which multi-channel sensing data is processed with embedded intelligence and the parametric information is output to the users.

FIG. 2 schematically illustrates a parametric sensor network according to an embodiment of the present invention, in which multi-channel sensing data is processed with embedded intelligence and the parametric information is output to the users. As shown in FIG. 2, the system includes: multiple embedded sensing devices 10 (only one is shown in FIG. 2), each embedded sensing device including multiple sensors 11a, 11b, ... 11n, and microprocessor(s) or other processing devices 12 with built-in artificial intelligence as an end unit with parametric outputs, a controller 20 that aggregates parametric outputs from multiple embedded sensing devices (end units) 10 with local intelligence and configurable control outputs, an optional gateway that aggregates output from multiple controllers and connects with a network, cloud and/or human interface 40. Each embedded sensing device (end unit) can capture data of the scene through multiple sensors with different functions and technologies; detect and track the objects of interest including persons; analyze features of the objects of interest; detect event and behavior associated with the detected objects of interest based on the features and/or events; and only provide these parametric outputs (without providing the video, audio or other underlying data) to the controller 20 which then provides it to a server 30 locally or to the cloud through a gateway. The aggregated information and analysis of detected events and objects behavior can be provided to defined users regularly and automatically. A detected abnormal event or behavior can be sent out as an alert or warning via actuator devices 50 such as alarm 50a, lighting control 50b, temperature control, and other discrete actuator controllers 50n which are connected to the controller 20. As an important part of this embodiment of the invention, the capabilities of artificial intelligence are obtained and refined through pre-defined training as well as continuous accumulation of the user data and machine learning. This system and method may be used for high-quality and cost effective senior care, security surveillance and public area monitoring.

In preferred embodiments, each embedded sensing device 10 is located within the physical proximity of the area being monitored, such as within a room or suite or house, and the multiple sensors 11a-n communicate with the processing device 12 using direct wired communication such as cables, or short-range wireless communication such as Bluetooth or WiFi. The processing device 12 may even be physically integrated with one of the sensors 11a-n. The controller 20 may be located within the physical proximity of the area being monitored, or at a distance from it, such as in a dedicated location within a large building. The processing device 12 communicates with the controller 20 using direct wired or short-range wireless communication, or via a network such as a LAN, WAN, or the Internet.

The output of each embedded sensing device 10 is formatted as parametric data which contains no image, video or sound, but contains all or some of the following: time stamp, environment setting (such as room type, furniture and space utilization, etc.), environmental parameters (such as ambient light, temperature, smoke, etc.), human status (occupancy, numbers of human, identifications, locations etc.), and human activities (length of stay, posture, motion, sound and voice etc.). The output parametric data may also contain: journal for daily activities, specific parameters for indoor or outdoor areas, environmental parameters received from external systems (weather station, emergency alerts etc.), human behaviors such as showering, eating or sleeping, a flag to indicate the human behaviors (such as normal, abnormal, emergency etc.), and human identifications that are tied to the human physical features and/or behaviors. The human identifications may be either real identification that can be preset by the firmware of processor 12, the controller 20 or the server/cloud, or virtual identification that can be assigned by the sensor.

Each embedded sensing device 10 is equipped with user interface devices that allows it to interact with a human or a monitored object through remote control, voice command or gesture and posture, etc. The sensors 11a-n and the actuator controllers 50a-n can be activated by such interaction. The sensors can constantly monitor the region of interest to recognize any such interaction commands, and the controller 20 can react to the interaction commands by sending commands to actuators. The controller 20 can output commands to the actuators based on the parametric data from the embedded sensing devices 10 or integrated parametric data, as well as pre-defined criteria.

The processing software in the processor 12 is organized as a pipeline that includes a set of processing elements, where each element is executed to perform the processing task of a particular kind and produces an output, and the output of one or more elements is used as the input of another element. Each type of the sensory data is the input of some elements in the pipeline. Some elements of the pipeline deploy classification algorithms trained or designed to recognize specific targets from the data in the supported media types (images, video frames and sound recordings) and to produce symbolic data or parametric outputs.

The embedded sensing devices 10 may generate the parametric output based on a set of object detection algorithms that utilize machine learning. In some embodiments, the object detection algorithms are based on deep neural network models trained in advance. The training of the algorithm may be preset, set up at the initial installation, activated or upgraded in-situ. The machine learning algorithm may utilize one or multiple models. The multiple models can be applied to data from an embedded sensing device either on same image frame or on different images through alternative in time-sequence. The multiple models can be applied to data from a set of controllers and sensors. The multiple models can increase accuracy and coverage of human or object detection. Further, the criteria used to generate commands for the actuators may be determined by the object detection algorithms.

The controller 20 and the embedded sensing devices 10 connected to it may be organized in a parent/child relationship and communicate with each other via REST API. The controller 20 may be integrated with one of the embedded sensing devices 10 or it may be a separate device. The controller 20 may be either stationary device or a mobile device. Regardless of the configuration, the controller 20 has a data management system with the ability to aggregate, analyze and store the parametric data (non-image data) from the one or multiple embedded sensing devices 10. The controller 20 may be connect to the internet, a phone line or a specific response such as an alarm.

Figure 3:
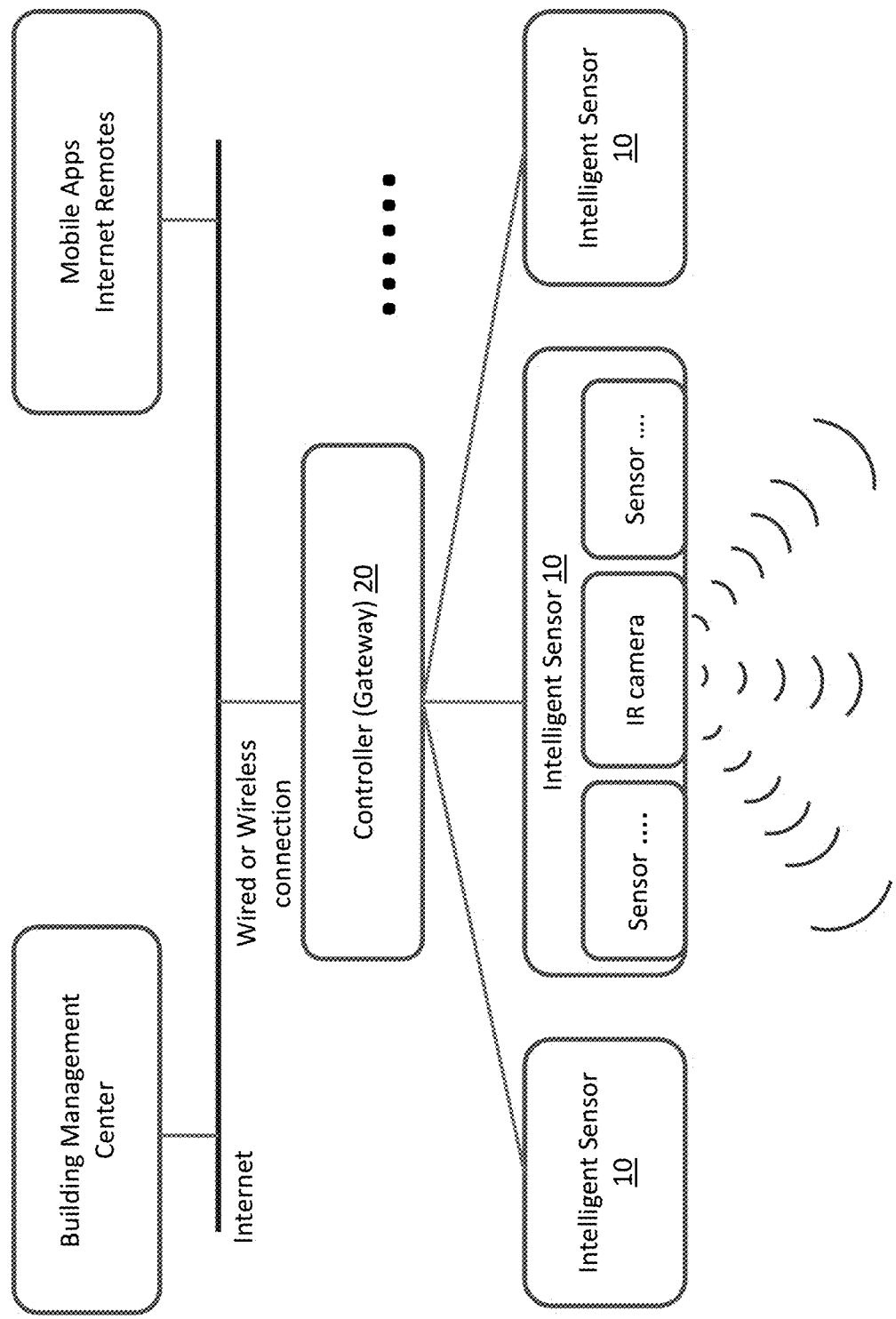
FIG. 3 is another schematic of a parametric sensor network according to an embodiment of the present invention that includes multiple sensing devices and also multiple controllers.
Figure 4:
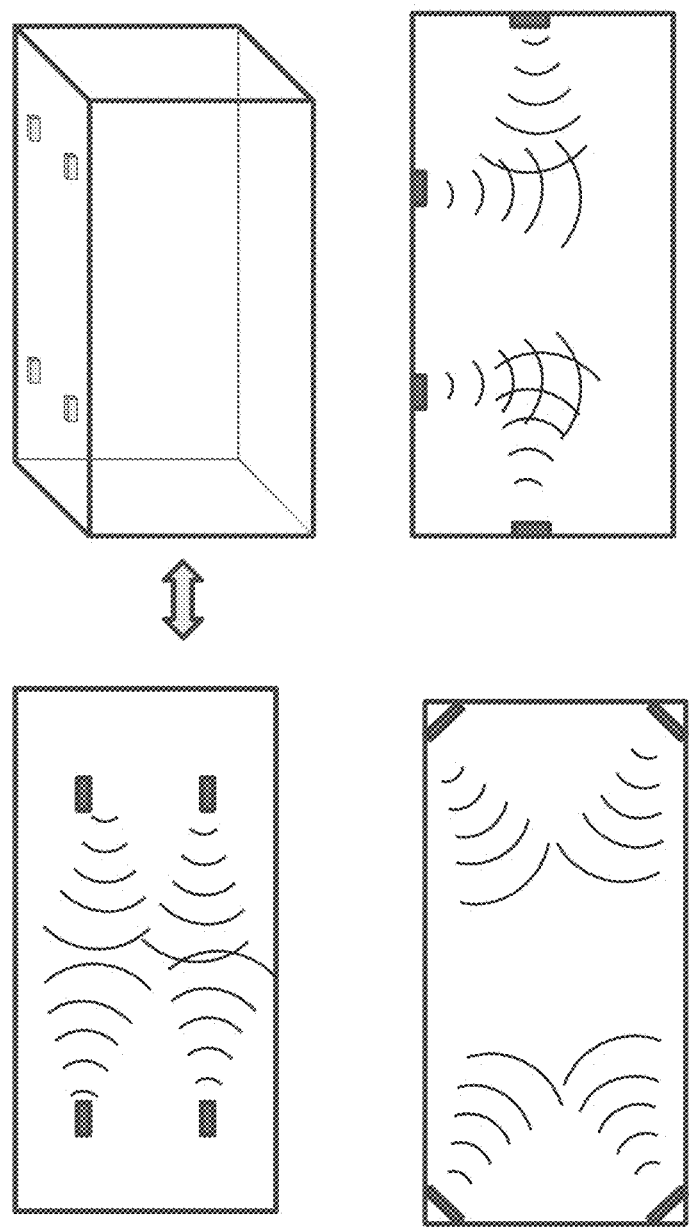
FIG. 4 is a schematic of multiple embedded sensing devices in one area to extend coverage.

FIG. 3 schematically illustrates a parametric sensor network according to another embodiment of the present invention which includes multiple embedded sensing devices and multiple controllers. FIG. 4 schematically illustrates a system of multiple embedded sensing devices in one area to extend coverage. The multiple embedded sensing devices 10 connected to the same controller 20 can have overlaps in their monitoring areas, so as to form a larger monitoring area. The embedded sensing devices 10 and the controller 20 may be installed independently on any part of a building structure, an outdoor area or integrated to a lighting fixture.

Figure 5:
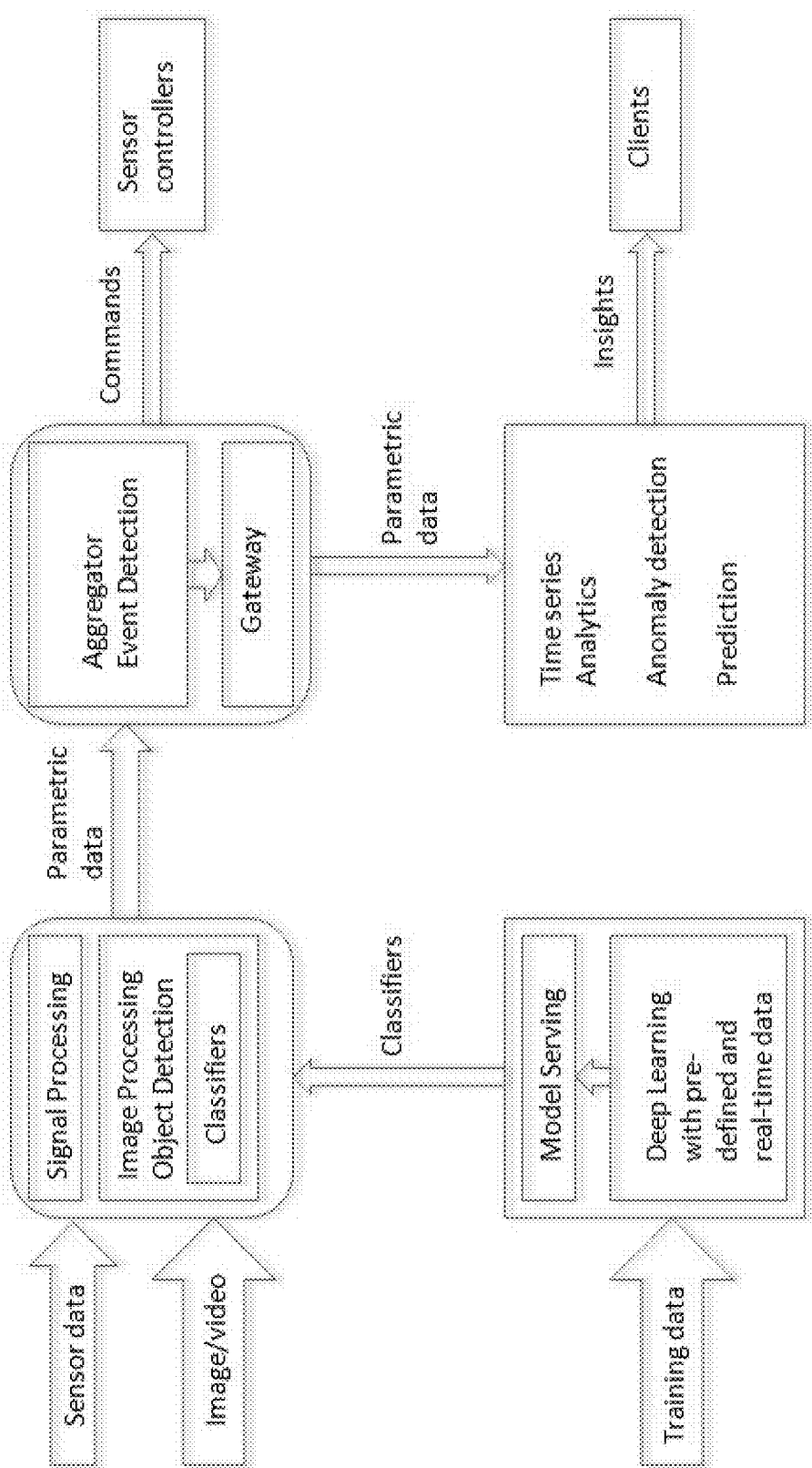
FIG. 5 is a schematic of the data flow of the parametric sensor network.

FIG. 5 schematically illustrates the data flow of the embedded sensing system and the functions of some of the components.

The system can be expanded to include multiple parametric sensor networks inter-connected with each other. These multiple parametric sensor networks can communicate with each other using wired or wireless communications. Each parametric sensor network in such an expanded system can receive, store and aggregate data from multiple embedded sensing devices 10 and command multiple actuators 50 across the expanded system.

Due to the fast progress in miniature sensors and microprocessors (CPU, GPU, FPGA, etc.), especially on smart phones, embedded sensor system with deep intelligence become feasible in technologies. In embodiments of the present invention, each embedded sensing device 10 may include one or more of the following sensors but not be limited to this list: 2D-image sensor (which may work in either the visible spectrum or the infrared spectrum or both), 3D depth sensing and contour/image detection, distance sensor, sound/audio recording device such as microphone and speaker, motion sensor, smoke sensor, temperature sensor, etc.

The data from the sensors are processed by the embedded processor 12. The processor may contain: microprocessor/single board computer, I/O interface with various sensors and actuators, firmware and algorithm to process the signals from the sensors, wired or wireless communication to the controller, and data storage.

The embedded sensing device 10 only exports parametric information processed on board by the embedded intelligence. It does not export the underlying video, audio, or other data produced by the sensors to the controller 20. This is a key to privacy protection. The embedded intelligence in the processor 12 is enabled by machine learning algorithms and accumulated user data. It may include the following capabilities: AI (artificial intelligence) algorithm and classifier, over-the-air update of the above algorithm and classifier, embedded data mining and analysis, embedded machine learning, and the capability to collaborate with cloud/server to extend intelligence.

The embedded intelligence performs human, objects and scene recognition and analysis, including:

Human detection and identification: position, posture and gesture through CV, 3D detection, audio, and motion sensor;

Key indoor objects (bed, sink, stove, refrigerator, sofa, table, toilet, bath tub, doors, windows, furniture, etc.) detection, identification and location;

Scene detection: sleep (on bed, movement); use bathroom (use toilet, take shower, take bath, use sink); kitchen activity (use stove, refrigerator, and other appliance); visitors/intruders detection (human in/out, doors, windows);

Human detection, identification, tracking;

Objects detection, identification, tracking;

Events detection: human motion (speed, and body movement); human location related to key indoor objects; events temporal length and frequency.

The embedded sensing devices 10 can also use the embedded algorithm to recognize the audio or video signatures of humans.

The embedded sensing device 10 then generates parametric output. For example, the parametric output and the timestamps associated with the data can be transmitted from the embedded sensing devices 10 to the controller 20 in pre-defined events such as an event that specific objects are being recognized in the images or the video frames. When generating parametric output, the processor 12 can use input from multiple ones of the sensors 11a-11n simultaneously to generate parametric data that would be either not available or inaccurate based only on data from a single sensor. The controller 20 integrates and coordinates multiple embedded sensing device's parametric output.

The backend system may be deployed to include the server and/or cloud. It enables developing, generating, testing and managing various classifiers for detecting and recognizing objects and events based on machine learning. It can also include long term data storage and analysis (long term behavior monitoring and analysis). Based on the parametric data output, users can have access to the following:

Alerts, warning to designated third party (relatives, caretaker, doctor, etc.);

Heath monitoring and long term behavior change through data and its analysis; and Service extension and upgrading.

In the parametric sensor network, each of the embedded sensing devices 10, the controller 20, and the server 30 can generate logs or journal files containing spatial and temporal information. The logs may contain spatial-temporal occupancy information such as presence, location, count, activity, identity, and track; they may further contain time derivative of the information such as speed, moving direction, rotation. The logs are multi-dimension time series data collected from multiple sensors and extracted from video or images. The dimensions of the time series data consists of measurements obtained directly from the sensors, and derived or aggregated data based on those measurements. The embedded sensing device and the controller can use the correlation of the aggregated multi-dimension data to improve event detection accuracy. The dimensions can be generally divided into rapid-changing and slow-changing categories. In a preferred embodiment, the processing of the rapid-changing dimensions is performed on the embedded sensing devices 10, whereas the processing of the slow-changing dimensions is performed on the controllers 20 or in the cloud.

Processing of the rapid-changing dimensions includes anomaly detection. In one embodiment, anomaly detection is done by periodically checking the values of the dimensions against pre-defined thresholds. Processing of the slow-changing dimensions includes anomaly detection and predictive analytics. Anomaly detection detects anomalies over a relatively long period of time. In one embodiment, anomaly detection is done by checking the values of the dimensions against pre-defined thresholds periodically or on-demand. In another embodiment, anomaly detection is done by searching for pre-defined patterns that are considered abnormal in the time series data periodically or on-demand. For predictive analytics, in one embodiment, predictive analytics is based on pre-defined rules, wherein patterns in the if part of the rules are matched against the patterns or shapes of interests over an earlier time interval and when matched, then part of the rules is used to predict certain parametric values in a future point in time. In another embodiment, predictive analytics is done using recurrent neural networks (RNN).

In an alternative embodiment, the image, video or voice data can be stored at the embedded sensing devices 10 or the controller 20, and/or transmitted among them. In such an alternative system, when a specific event is triggered, indicating a pre-defined situation, the controller 20 may pull images or video sequences from one or more of the embedded sensing devices 10 and store the data in its data storage sub-system. The event may also trigger immediate commands at the embedded sensing device level.

The data management system may have the following components or layers: local server; cloud; service; over the air updating; security; privacy level definition; and monitoring area definition. The privacy setting can be set to different levels: high, no image storage and output at local enclosure level; intermediate, local image storage but no image output; or low, controller level image storage.

To summarize, embodiments of this invention provide a sensing system with combination of imaging and non-imaging sensors and embedded deep intelligence to enable fast response and strong privacy protection. The potential applications include but are not limited to: elderly care, surveillance, hazard monitoring, long term behavior monitoring, and extended capability.

It will be apparent to those skilled in the art that various modification and variations can be made in the multi-channel sensing system with embedded processing of the present invention without departing from the spirit or scope of the invention. Thus, it is intended that the present invention cover modifications and variations that come within the scope of the appended claims and their equivalents.

What is claimed is:

1. A parametric sensor network system comprising:
   a plurality of embedded sensing devices, each including:
      a plurality of sensors, including at least one imaging sensor, 3D depth sensors, distance sensors, audio sensors, temperature sensors, and smoke sensors, the plurality of sensors configured to generate at least audio, image and video data; and
      a data processing unit connected to and receiving the audio, image and video data from the plurality of sensors, the data processing unit including one or more processors, the data processing unit implementing an object detection algorithm to detect presence and locations of objects and humans, the data processing unit further implementing a human identification algorithm for identifying at least one specific human based on the audio and video data received from the sensors,
      wherein the data processing unit generates parametric data based on the data received from the sensors using the object detection algorithm, wherein the parametric data include the identification and location of the specific human; and
   a controller connected to and receiving data from each of the plurality of embedded sensing devices; and
   a plurality of actuators coupled to the controller;
   wherein each embedded sensing device outputs only the parametric data, which include the identification and location of the specific human, to the controller without automatically outputting any video, image or audio data generated by the sensors to the controller; and
   wherein the parametric data generated by the data processing unit and outputted by the embedded sensing devices further include parameters describing a room type of a room, furniture and space utilization of the room, locations of indoor objects in the room, ambient light, temperature, presence of smoke, occupancy, numbers of humans, a length of stay by the specific human, postures and gesture of the specific human, motions of the specific human, sound and voice of the specific human, a location of the specific human relative to the indoor objects, activities of the specific human in relation to the indoor objects, temporal length and frequency of the activities of the specific human, a journal of daily activities of the specific human, behaviors of the specific human, and a flag which indicates whether the behaviors of the specific human is normal or abnormal,
   wherein the controller generates commands for controlling the actuators based on the parametric data received from the plurality of embedded sensing devices.

2. The system of claim 1, wherein the data processing unit includes a plurality of processing elements organized as a pipeline, wherein each processing element is configured to perform a defined processing task and to produce an output, and wherein an output of at least one of the plurality of processing elements is inputted to another one of the plurality of processing elements as input.

3. The system of claim 1, wherein each of the plurality of embedded sensing device further includes a user interface device configured to receive commands from a human or object, the user interface device including one or more of: a remote control, voice recognition algorithm implemented in the data processing unit and configured to recognize a command, and a gesture and posture recognition algorithm implemented in the data processing unit and configured to recognize a gesture and posture.

4. The system of claim 1, wherein the plurality of actuators includes a lighting control actuator, a temperature control actuator, and an alarm actuator.

5. The system of claim 1, wherein the data processing unit further includes data storage devices configured to store data generated by the plurality of sensors.

6. The system of claim 1, wherein the controller is further connected to an external network, a telephone line, or an alarm device.

7. The system of claim 1, wherein the embedded sensing devices and the controller are configured to define a privacy level of the embedded sensing devices and the controller, and to define a monitoring area for each embedded sensing device.

8. The system of claim 7,
   wherein either the privacy level is a high privacy level, wherein each embedded sensing device is configured to store no video or image data captured by the sensors; or
   the privacy level is an intermediate privacy level, wherein each embedded sensing device further includes a data storage device and the embedded sensing device is configured to store video or image data captured by the sensors in the data storage device of the embedded sensing device; or
   the privacy level is a low privacy level, wherein the controller further includes a data storage sub-system, and the controller is configured to pull video or image data from the embedded sensing devices and store the video or image data in the data storage sub-system.

9. The system of claim 1, wherein the controller further includes a data storage sub-system, and wherein the controller is further configured to, in response to detecting a predefined trigger event, pull video or image data from one or more of the embedded sensing devices and store the video or image data in the data storage sub-system; and
   wherein in response to detecting the predefined trigger event, the controller is further configured to generate predefined commands to the embedded sensing devices.

10. The system of claim 9, wherein the controller is further configured to generate a journal file of the controller containing spatial and temporal information based on the parametric data and the video or image data received from the embedded sensing devices.

11. The system of claim 10, wherein the data processing unit of each embedded sensing device is configured to generate multi-dimension time series data and to store the multi-dimension time series data in a journal file of the embedded sensing device; and
    wherein the controller is configured to extract information from the video or image data received from the embedded sensing devices, to generate aggregated multi-dimension time series data based on the parametric data received from the embedded sensing devices and the extract information, and to store the aggregated multi-dimension time series data in the journal file of the controller.

12. The system of claim 11, wherein the controller is further configured to perform event detection based on correlations in the aggregated multi-dimension time series data.

13. The system of claim 11, wherein the multi-dimension time series data includes rapid-changing time series data and slow-changing time series data;
    wherein the controller is further configured to processes the slow-changing time series data.

14. The system of claim 1, wherein the object detection algorithm implemented in the data processing unit of each embedded sensing device is a machine leaning algorithm.

15. The system of claim 14, wherein machine learning algorithm is implemented by one or multiple deep neural network models trained in advance.

\* \* \* \* \*